United States Patent
Tao et al.

(10) Patent No.: US 9,070,037 B2
(45) Date of Patent: Jun. 30, 2015

(54) METHOD, APPARATUS AND SYSTEM FOR RECOGNIZING MAGNETIC INK CHARACTER

(75) Inventors: Peng Tao, Weihai (CN); Qiangzi Cong, Weihai (CN); Chuntao Wang, Weihai (CN); Tianxin Jiang, Weihai (CN); Yueqi Xing, Weihai (CN)

(73) Assignee: Shandong New Beiyang Information Technology Co., Ltd., Weihai, Shandong (CN)

( * ) Notice: Subject to any disclaimer, the term of this patent is extended or adjusted under 35 U.S.C. 154(b) by 238 days.

(21) Appl. No.: 13/698,434

(22) PCT Filed: Apr. 27, 2011

(86) PCT No.: PCT/CN2011/073408
§ 371 (c)(1),
(2), (4) Date: Nov. 16, 2012

(87) PCT Pub. No.: WO2011/143998
PCT Pub. Date: Nov. 24, 2011

(65) Prior Publication Data
US 2013/0071005 A1    Mar. 21, 2013

(30) Foreign Application Priority Data
May 18, 2010   (CN) .......................... 2010 1 0174917

(51) Int. Cl.
*G06K 9/00*   (2006.01)
*G06K 9/18*   (2006.01)

(52) U.S. Cl.
CPC .................................... *G06K 9/186* (2013.01)

(58) Field of Classification Search
None
See application file for complete search history.

(56) References Cited

U.S. PATENT DOCUMENTS 3,629,829 A * 12/1971 Ordower ..................... 382/139

FOREIGN PATENT DOCUMENTS

EP   0774728 B1   2/2003

OTHER PUBLICATIONS

International Search Report for corresponding Application No. PCT/CN2011/073408, dated Nov. 24, 2011 (8 pgs.).
Written Opinion of the International Search Authority for corresponding Application No. PCT/CN2011/073408, dated Aug. 4, 2011 (7 pgs.).
International Preliminary Report on Patentability for corresponding Application No. PCT/CN2011/073408, dated Nov. 20, 2012 (9 pgs.).
Chen et al., "Spatial Neighboring Clustering Method for Hyperspectral Imagery Based on Kernal Spectral Angel Cosine," Acta Electronica Sinica, Oct. 31, 2008, vol. 36, No. 10, pp. 1992-1995.

* cited by examiner

*Primary Examiner* — Shervin Nakhjavan
(74) *Attorney, Agent, or Firm* — Shumaker & Sieffert, P.A.

(57) ABSTRACT

Disclosed are a magnetic ink character recognition method, apparatus and system. The method includes: reading a magnetic signal of a magnetic ink character on a medium to be recognized; acquiring the amplitude characteristic data of the magnetic ink character according to the magnetic signal thereof; and performing spectral angle cosine match processing on the amplitude characteristic data of the magnetic ink character to obtain the recognition result of the magnetic ink character. The present method can reduce the stability requirements on the magnetic signal and improve the recognition rate of the magnetic signal.

17 Claims, 9 Drawing Sheets

Fig. 1

MICR TEST DOCUMENT - SIGNAL,
                    LOW LEVEL
Signal Level: 40% to 55%

Part No. 2730 5192

TEST MODE:  • DC Only - Test Switches XJ7, XJ8/.
            • AC Only - Test Switches XJ7/, XJ8.
            • Double Read - Test Switches XJ7/, XJ8/.

METHOD, APPARATUS AND SYSTEM FOR RECOGNIZING MAGNETIC INK CHARACTER

FIELD OF THE INVENTION

The present invention relates to a magnetic ink character recognition method, apparatus and system.

BACKGROUND OF THE INVENTION

Recently, during the automatic machine recognition and automatic transaction processing of bank checks printed with magnetic ink characters and the information on other payment media, since the magnetic ink character has advantages of strict printing specifications, being convenient for the device recognition and reading and manual recognition and reading and so on, the magnetic ink character recognition (abbreviated as MICR) technology has been widely applied in the bank field and other payment fields.

For example, in the prior art, an image scanning method employing an optical scanning apparatus can be used to automatically recognize the information on bank checks or other payment medium (such as images obtained by CIS and CCD), however, when on the medium there are stained characters or missed characters or the concentration of the printing characters grow thinner, the quality of the scanned image will decline obviously, and when optical character recognition (such as OCR recognition and so on) is performed on the information, the recognition rate of the characters will decline due to the decline of the quality of the original scanned image. Since the effect on the magnetic signal due to stained characters, missed characters, printing characters being uneven in concentration and the like on the medium is little, performing character recognition using magnetic ink character magnetic signal can effectively improve the recognition rate of the characters and reduce the effect on the character recognition stability caused by the decline of the quality of the magnetic ink character image on the medium.

The process of character recognition of the magnetic ink signal is as follows: first, reading a magnetic string formed by a plurality of characters representing check number or other information printed on the medium using a magnetic head, generating a corresponding magnetic string signal, and then performing positioning, segmenting, character extraction and character recognition on the magnetic string signal. Although, performing recognition using the magnetic properties of the magnetic signal can improve the character recognition rate, the magnetic character recognition rates of different magnetic character recognition methods are also different, and the requirements on the stability of the magnetic signal are also different, and the requirements on the stability of the magnetic signal by the current magnetic character recognition method are relatively high.

For example, American patent US2007/0267495 proposes a character recognition method using the amplitude features after Fourier transform of the magnetic signal, in which in order to reduce the effect on the recognition rate by the significant change of the amplitude of the signal, this method has to normalize the amplitude characteristic vector of the original signal for Fourier transform before matching and recognition so as to avoid some effective features being covered by the noise interference in the signal and then directly matches the extracted amplitude features with the amplitude template of each character in the template library and selects the template character with the closest amplitude feature as the recognition character, however, since normalization cannot well effectively overcome the effect on character recognition by the significant change of the amplitude caused by the magnetic signal due to external noise interference, this method puts high requirements on the stability of the original magnetic signal, and comparison recognition is performed using the amplitude size of the amplitude feature, and the character recognition rate declines obviously when the external interference causes the amplitudes of different characters to change significantly.

There is still no effective solution proposed regarding the problem in the related art that the character recognition rate declines when the amplitude of the magnetic ink character signal varies significantly.

SUMMARY OF THE INVENTION

The present invention is proposed regarding the problem in the related art that the character recognition rate declines when the amplitude of the magnetic ink character signal varies significantly, and for this end, the main object of the present invention is to provide a magnetic ink character signal recognition method, apparatus and system, so as to solve the above problem.

In order to achieve the above object, a magnetic ink character signal recognition method is provided according to one aspect of the present invention.

The magnetic ink character signal recognition method according to the present invention includes: reading a magnetic signal of a magnetic ink character on a medium to be recognized; acquiring the amplitude characteristic data of the magnetic ink character according to the magnetic signal of the magnetic ink character; and performing spectral angle cosine match processing on the amplitude characteristic data of the magnetic ink character to obtain a recognition result of the magnetic ink character.

Furthermore, the step of performing spectral angle cosine match processing on the amplitude characteristic data of the magnetic ink character to obtain a recognition result of the magnetic ink character comprises: performing spectral angle cosine match processing on the amplitude characteristic data of the magnetic ink character and the amplitude characteristic data of each magnetic ink character in a template library to obtain a set of magnetic ink character matching degree; and selecting a character corresponding to the maximum value of matching degree in the set as the recognition result of the magnetic ink character.

Furthermore, the spectral angle cosine match processing is to perform spectral angle cosine calculation on the amplitude characteristic data of the magnetic ink character on the medium to be recognized and the amplitude characteristic data of each reference character in the template library, and the matching degree of the magnetic ink character is characterized by the obtained spectral angle cosine of the magnetic ink character.

Furthermore, the following equation can be used to calculate the spectral angle cosine:

$$\cos(x, y) = \frac{\langle x, y \rangle}{\sqrt{\langle x, x \rangle} \sqrt{\langle y, y \rangle}}$$

where x is the amplitude characteristic vector of each reference character in the template library, and y is the amplitude characteristic vector of the magnetic ink character on the medium to be recognized.

Furthermore, on the medium to be recognized comprises one or more magnetic ink character.

Furthermore, acquiring the amplitude characteristic data of the magnetic ink character according to the magnetic signal of the magnetic ink character comprises: segmenting the continuous magnetic signals of a plurality of magnetic ink characters on the medium to be recognized to obtain single magnetic signal of the magnetic ink character, wherein the magnetic signal of the magnetic ink character is a time domain signal; and converting the magnetic signal of each magnetic ink character into a frequency domain signal by Fourier transform; and performing amplitude calculation on the frequency domain signal to obtain the amplitude characteristic data of the single magnetic signal of the magnetic ink character.

Furthermore, after performing spectral angle cosine match processing on the amplitude characteristic data of the magnetic ink character to obtain the recognition result of the magnetic ink character, the above method further comprises: outputting the recognition result of the magnetic ink character.

In order to achieve the above object, a magnetic ink character signal recognition apparatus is provided according to another aspect of the present invention.

The magnetic ink character signal recognition apparatus according to the present invention includes: a magnetic ink character reading mechanism for reading a magnetic signal of a magnetic ink character on a medium to be recognized; an acquisition module for acquiring the amplitude characteristic data of the magnetic ink character according to the magnetic signal of the magnetic ink character; and a match processing module for performing spectral angle cosine match processing on the amplitude characteristic data of the magnetic ink character to obtain the recognition result of the magnetic ink character.

Furthermore, the acquisition module comprises: a segmentation module for segmenting the continuous magnetic signals of a plurality of magnetic ink characters on the medium to be recognized to obtain the single magnetic signal of the magnetic ink character, wherein the magnetic signal of the magnetic ink character is a time domain signal; a conversion module for converting the magnetic signal of each magnetic ink character into a frequency domain signal by way of Fourier transform; and a first calculation module for performing amplitude calculation on the frequency domain signal to obtain the amplitude characteristic data of the magnetic signal of the single magnetic ink character. The match processing module includes: a second calculation module for performing spectral angle cosine match processing on the amplitude characteristic data of the magnetic ink character and the amplitude characteristic data of each magnetic ink character in a template library to obtain a set of magnetic ink character matching degree; and a confirmation module for selecting a character corresponding to the maximum value of matching degree in the set as the recognition result of the magnetic ink character.

Furthermore, the above magnetic ink character signal recognition apparatus further comprises: an outputting module for outputting the recognition result of the magnetic ink character.

In order to achieve the above object, a magnetic ink character signal recognition system is provided according to still another aspect of the present invention. The magnetic ink character signal recognition system includes any one of the magnetic ink character signal recognition apparatus provided by the present invention.

In order to achieve the above object, a magnetic ink character signal recognition system is provided according to still another aspect of the present invention, including: a magnetic ink character reader providing a time domain signal of a magnetic ink character; and a computer system connected to the magnetic ink character reader for acquiring the amplitude characteristic data of the magnetic ink character according to the frequency domain signal obtained according to the time domain signal of the magnetic ink character, performing spectral angle cosine match processing on the amplitude characteristic data of the magnetic ink character, generating and outputting the recognition result of the magnetic ink character.

By means of the present invention, the magnetic signal of the magnetic ink character on the medium to be recognized is read; the amplitude characteristic data of the magnetic ink character is acquired according to the magnetic signal of the magnetic ink character; spectral angle cosine match processing is performed on the amplitude characteristic data of the magnetic ink character to obtain the recognition of the magnetic ink character, which effectively solves the problem in the related art that the character recognition rate declines when the amplitude of the magnetic ink character signal varies significantly, thereby achieving the effects of reducing the stability requirements on the magnetic signal and improve the recognition rate of the magnetic signal.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

It needs to note that the embodiments of the present application and the features in the embodiments can be combined with each other if there is no conflict. The present invention will be described hereinafter in detail with reference to the accompanying drawings and in conjunction with embodiments.

A magnetic ink character signal recognition system is provided according to the embodiments of the present invention.

Figure 1:
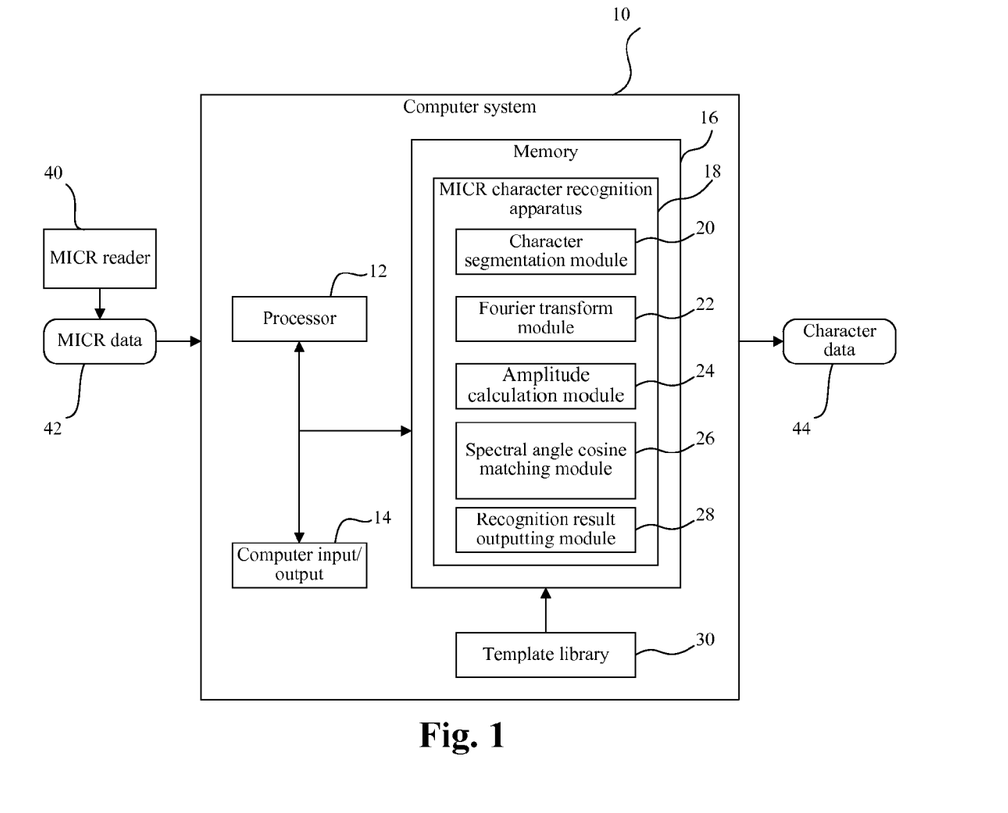
FIG. 1 is a schematic diagram of the structure of a magnetic ink character recognition system according to embodiment of the present invention.

FIG. 1 is a schematic diagram of the structure of a magnetic ink character recognition system according to embodiment of the present invention.

As shown in FIG. 1, the system includes: a computer system 10, an MICR reader 40, inputted MICR data 42 and outputted recognition character data 44. The MICR reader 40 is connected to the computer system 10 and provides a time domain signal of the magnetic ink character thereto.

The computer system 10 includes a processor 12, a computer input/output 14, a computer memory 16 and a template library 30 which is a set of the amplitude characteristic templates of various magnetic ink characters. The computer memory 16 stores an MICR character recognition apparatus 18 which includes a character segmentation module 20, a Fourier transform module 22, an amplitude calculation module 24, a spectral angle cosine matching module 26 and a recognition result outputting module 28. The computer system 10 acquires the amplitude characteristic data of the magnetic ink character according to a frequency domain signal converted from the time domain signal of the magnetic ink character and performs spectral angle cosine match processing on the amplitude characteristic data of the magnetic ink character, and generates a recognition result of the magnetic character outputted by the recognition result outputting module 28.

Figure 2:
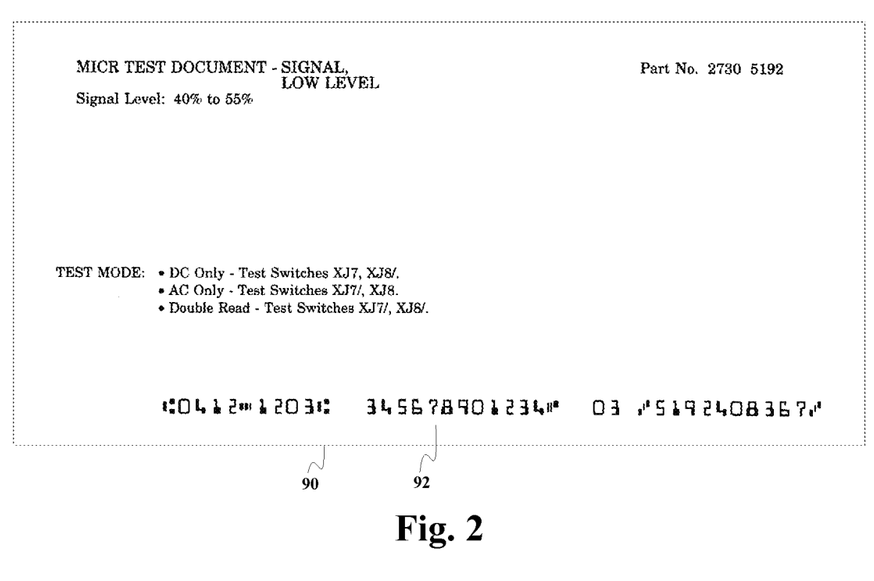
FIG. 2 is a schematic diagram of a check with a magnetic ink character according to the embodiment of the present invention.

The MICR data 42 usually includes the time domain signal generated by the MICR reader 40 reading the magnetic ink character printed on medium such as checks and so on, for example, FIG. 2 is a schematic diagram of a check with a magnetic ink character according to the embodiments of the present invention, in which a check 90 is printed thereon with a magnetic ink string 92 in the format of E13B formed by any characters of 14 E13B magnetic ink characters (0-9 and 4 special characters) arranged according to a certain space. After the MICR data 42 read from the MICR reader 40 is inputted into the computer system, a controller 12 performs magnetic ink character recognition on the received data via a character recognition system 18 in the computer memory 16, wherein a character segmentation module 20 segments the inputted MICR data 42 according to certain regulations (such as National Standards GB 12184-90) into a magnetic signal in a single character; then, the Fourier transform module 22 performs Fourier transform on the segmented magnetic signal and converts the same from a time domain signal to a frequency domain signal; the amplitude calculation module 24 calculates the amplitude of the frequency domain signal after Fourier transform to obtain the amplitude data of each character frequency domain signal; the matching module 26 performs spectral angle cosine match processing on the generated amplitude data and the template of each character in the template library 30, that is, calculating the spectral angle cosine by way of spectral angle calculation, and the recognition result outputting module 28 selects a character having the greatest matching degree (i.e. spectral angle cosine) as the recognition result for outputting, and the processing results of all the characters form recognized character data 44. The character recognition result can also be outputted by the input/output 14 of the computer, such as displaying the recognition result by means of a display, furthermore, the recognition result can be inputted into other processing devices, memory devices or display devices and so on locally or via a network.

The computer can acquire the magnetic ink character signal by means of an external MICR reader 40 and performs character recognition on the extracted amplitude characteristic data by means of the spectral angle cosine matching method by performing positioning, segmentation, Fourier transform and amplitude characteristic extraction on the magnetic character string signal. In this system, even the amplitude characteristic curve of the magnetic signal varies significantly relative to the amplitude template curve, the MICR will not have wrong recognition.

Figure 3:
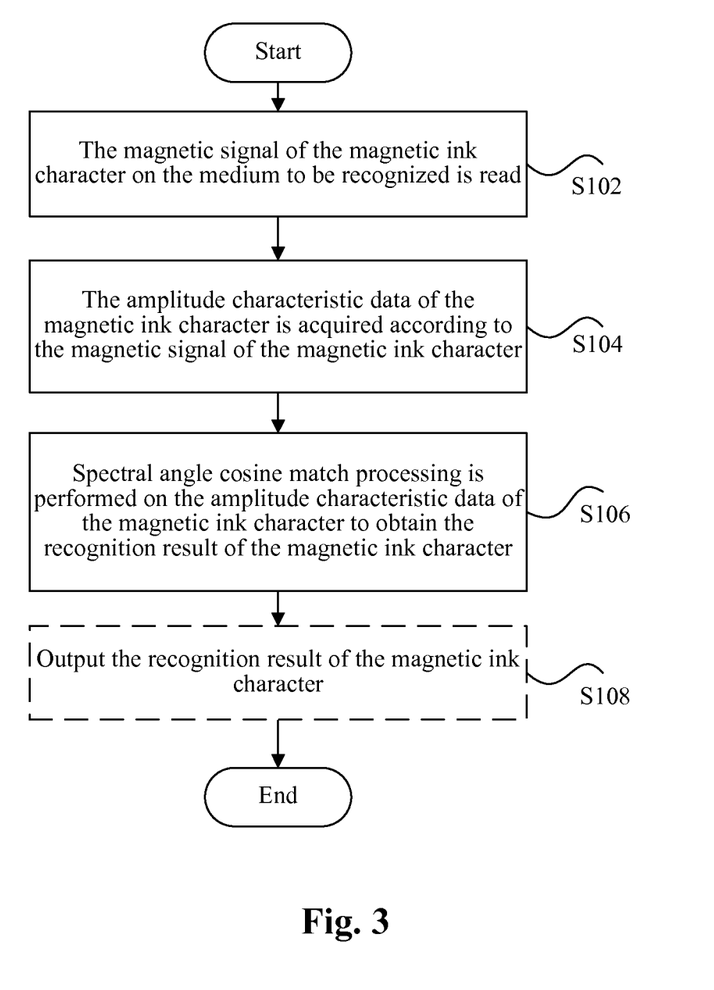
FIG. 3 is a flowchart of a magnetic ink character recognition process according to the embodiment of the present invention.

FIG. 3 is a flowchart of a magnetic ink character recognition process according to embodiment of the present invention.

As shown in FIG. 3, the method includes the following steps S102 to S106:

in step S102, the magnetic signal of the magnetic ink character on the medium to be recognized is read, and this reading process can be done using an MICR reading mechanism.

In step S104, the amplitude characteristic data of the magnetic ink character is acquired according to the magnetic signal of the magnetic ink character; for example, the amplitude characteristic data of the converted frequency domain signal can be extracted by performing positioning, segmentation and Fourier transform on the magnetic ink string signal.

In step S106, spectral angle cosine match processing is performed on the amplitude characteristic data of the magnetic ink character to obtain the recognition result of the magnetic ink character; for example, the character recognition result can be obtained by matching method of performing a spectral angle cosine calculation on the amplitude characteristic of the character and that of the template.

In the above embodiment, the amplitude characteristic is acquired and match processing of spectral angle cosine calculation is performed on the acquired amplitude characteristic data, thereby there is no need to normalize the Fourier transformed frequency domain signal and overcoming the problem such as the recognition rate declines due to the significant amplitude jitter of the original magnetic signal availably, reducing the stability requirements of the magnetic signal, and the above recognition method can be well applied to the magnetic signal.

Preferably, after step S106, the method further includes step S108 to output the recognition result of the magnetic ink character.

In the embodiments of the present invention, the step of performing spectral angle cosine match processing on the amplitude characteristic data of the magnetic ink character to obtain the recognition result of the magnetic ink character comprises: performing spectral angle cosine match processing on the amplitude characteristic data of the magnetic ink character and that of each magnetic ink character in a template library to obtain a set of magnetic ink character matching degree; and selecting the character corresponding to the maximum value of matching degree in the set as the recognition result of the magnetic ink character.

In this case, the spectral angle cosine match processing is to perform spectral angle cosine calculation on the amplitude characteristic data of the magnetic ink character on the medium to be recognized and the amplitude characteristic data of each reference character in the template library, and the matching degree of the magnetic ink character is characterized by the obtained spectral angle cosine of the magnetic ink character.

In the embodiments of the present invention, the magnetic ink character can be one or more magnetic ink character.

Figure 4:
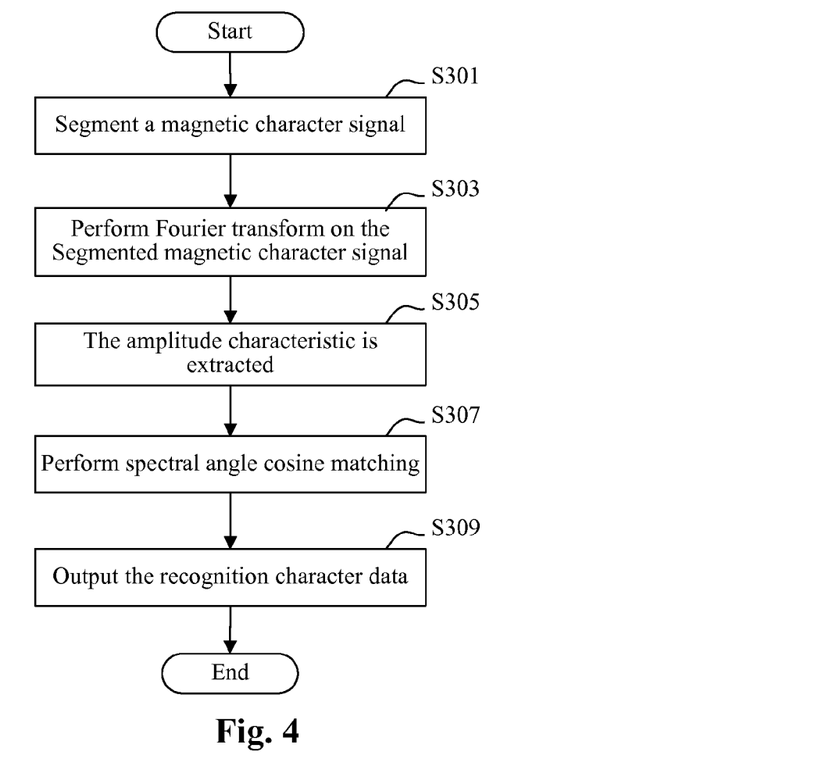
FIG. 4 is a flowchart of a magnetic ink character recognition process according to preferred embodiment of the present invention.

FIG. 4 is a flowchart of a magnetic ink character recognition process according to preferred embodiment of the present invention.

As shown in FIG. 4, this method includes the following steps:

in step S301, a processor segments the magnetic signal of a magnetic ink character. The magnetic signal of the magnetic ink character is segmented to obtain the magnetic signal of a single magnetic ink character, wherein the magnetic signal of the magnetic ink character is a time domain signal.

Figure 5:
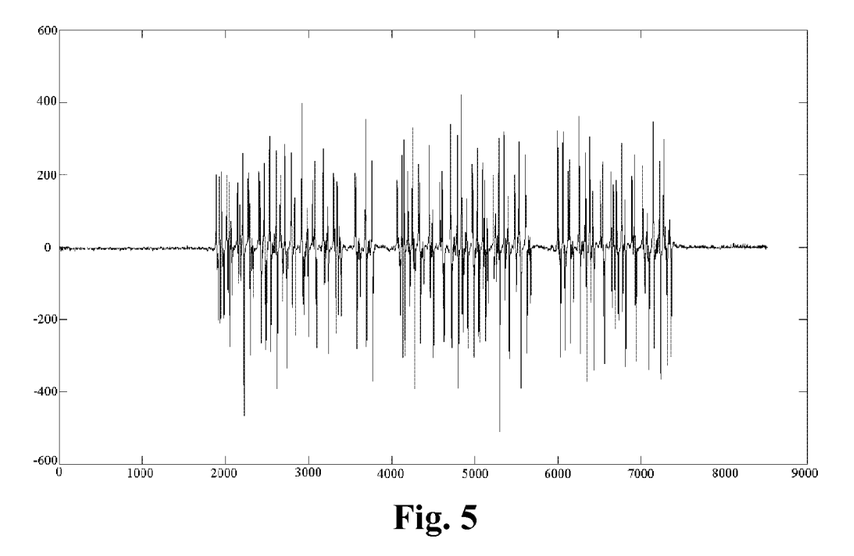
FIG. 5 is a schematic diagram of a time domain magnetic signal of a magnetic ink character according to the embodiment of the present invention.

In the embodiment of the present invention, the character segmentation module 20 in the character recognition system 18 segments the received magnetic signal 42, and segments the continuous waveforms of a plurality of characters shown in FIG. 5 into a single character waveform according to a certain standard. In this case, FIG. 5 is a schematic diagram of a time domain magnetic signal of a magnetic ink character according to the embodiments of the present invention; and FIG. 6 is a schematic diagram of the amplification of the magnetic signal of a magnetic ink character 0 according to FIG. 5.

Figure 6:
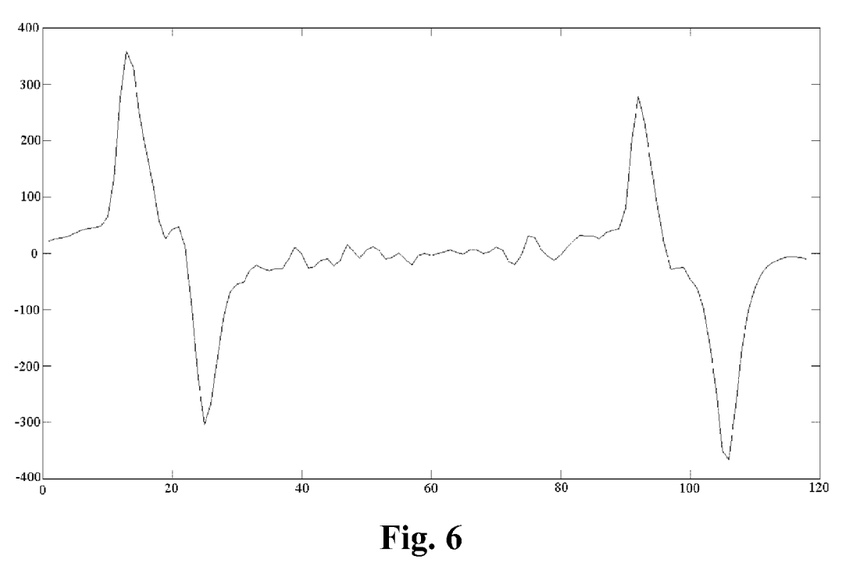
FIG. 6 is a schematic diagram of the amplification of the magnetic signal of a magnetic ink character 0 according to FIG. 5.

In the embodiments of the present invention, the MICR reader 40 reads the magnetic ink string 92 on the check 90 and then generates a time domain waveform of the magnetic ink character signal, which waveform includes the time domain waveforms of a plurality of characters, and it can be seen from FIG. 5 that the time domain waveform of the magnetic signal varies continuously and the magnetic signal waveform of each character cannot be distinguished directly; and according to the printing specifications of magnetic ink character recognition in China, such as starting character characteristic, character spacing and so on, the character segmentation module 20 segments the time domain waveform in FIG. 5 into the magnetic signal waveform of a single character, and the time domain amplification waveform of the segmented character 0 is shown in FIG. 6.

In step S303, the processor performs Fourier transform on the magnetic signal of a magnetic ink character. Fourier transform is performed on the magnetic signal of each magnetic ink character to convert the magnetic signal of the magnetic ink character into a frequency domain signal.

In the embodiments of the present invention, the Fourier transform module 22 performs Fourier transform on the magnetic signal of a single magnetic ink character to convert the magnetic signal in time domain into a magnetic signal in frequency domain.

In step S305, the amplitude characteristic is extracted. Amplitude calculation is performed on the frequency domain signal to obtain the amplitude characteristic data of the magnetic signal of a single magnetic ink character. In the embodiments of the present invention, the amplitude calculation module 24 performs amplitude calculation on the magnetic signal in frequency domain to obtain the amplitude characteristic of each magnetic ink character.

In step S307, the processor performs spectral angle cosine matching. Spectral angle cosine match processing is performed on the amplitude characteristic data of the magnetic ink character and that of each magnetic ink character in a template library to obtain a set of magnetic ink character matching degree; and a confirmation module for selecting the character corresponding to the maximum value of matching degree in the set as the recognition result of the magnetic ink character.

Figure 7:
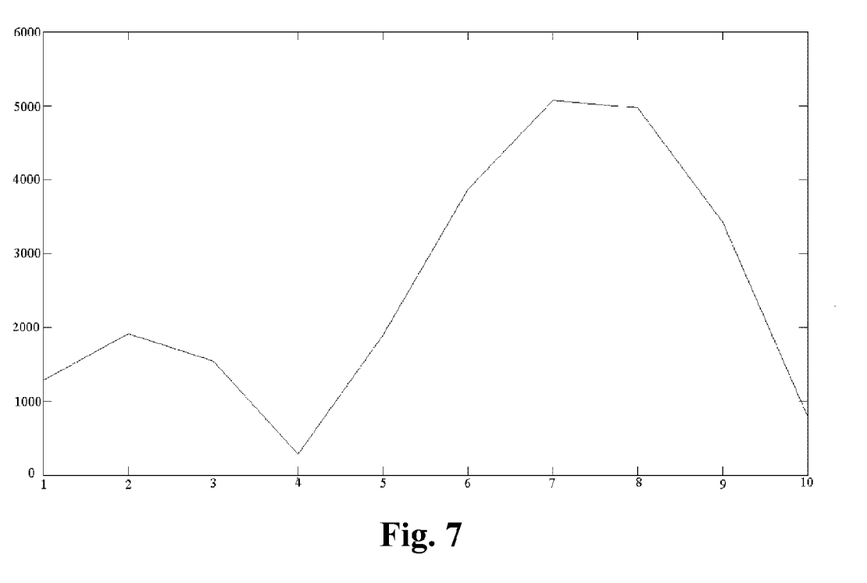
FIG. 7 is a waveform diagram of an amplitude characteristic template of a magnetic ink character 0 according to the embodiments of the present invention.
Figure 8:
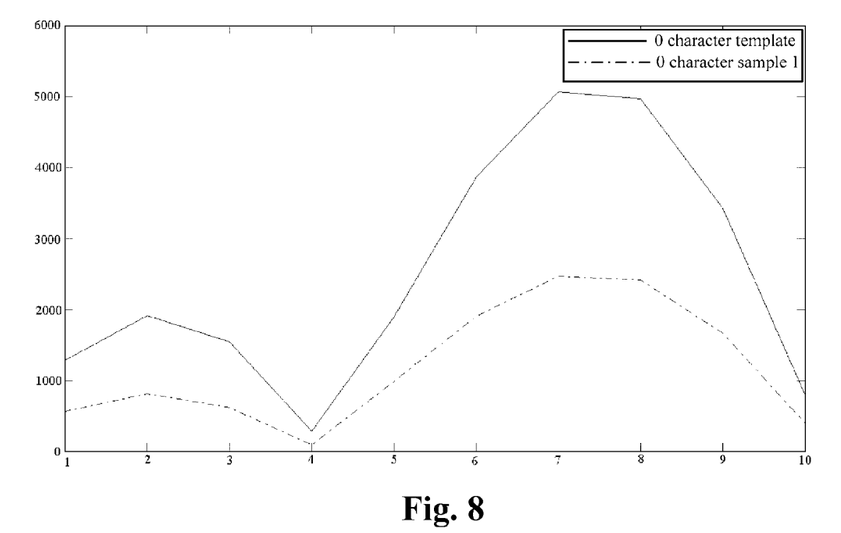
FIG. 8 is a schematic diagram of the comparison of the amplitude characteristic of a magnetic ink character 0 and that of a character 0 in a template library according to the embodiments of the present invention.
Figure 9:
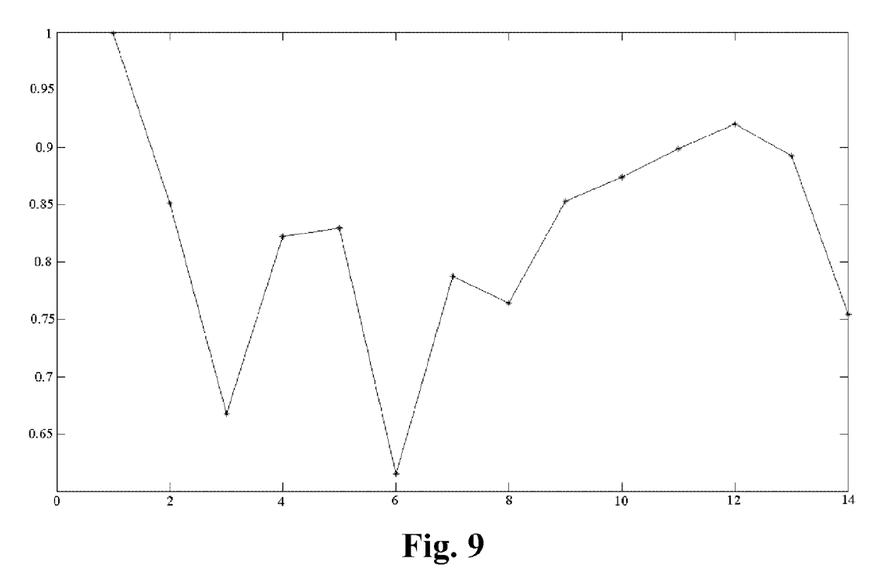
FIG. 9 is a schematic diagram of the spectral angle cosine matching of the amplitude characteristic of a magnetic ink character 0 and the amplitude characteristic templates of all the characters in the template library according to the embodiments of the present invention.

FIG. 7 is a waveform diagram of an amplitude characteristic template of a magnetic ink character 0 according to the embodiments of the present invention; FIG. 8 is a schematic diagram of the comparison of the amplitude characteristic of a magnetic ink character 0 and that of a character 0 in a template library according to the embodiments of the present invention; FIG. 9 is a schematic diagram of the spectral angle cosine matching of the amplitude characteristic of a magnetic ink character 0 and the amplitude characteristic templates of all the characters in the template library according to the embodiments of the present invention.

In the embodiments of the present invention, FIG. 8 is a schematic diagram of the comparison of the amplitude characteristic of a character 0 and the templates in a template library according to the embodiments of the present invention, wherein the dashed line graph is the amplitude characteristic graph of the character 0, and as compared to the template of the character 0 in the template library represented by the solid line, the two graphs are very similar although there is significant different regarding amplitude. The amplitude characteristic of character 0 is compared with the templates of all the characters in the template library to obtain a spectral angle cosine matching degree curve as shown in FIG. 9, it can be seen from the curve in the figure that the amplitude characteristic of character 0 to be recognized have the highest matching degree with the template of character 0 (the matching degree approximates 1) and have relatively low matching degree with other characters (the maximum value is 0.92), and the character with the highest matching degree is chosen as the recognition character, therefore, character 0 to be recognized is recognized as character 0 instead of other character.

Spectral angle cosine calculation is performed on the amplitude characteristic of each generated character and the amplitude of the template signals of all the characters in the template library 30 according to the following equation to obtain a plurality of spectral angle cosine values:

$$\cos(x, y) = \frac{\langle x, y \rangle}{\sqrt{\langle x, x \rangle} \sqrt{\langle y, y \rangle}}$$

X and y respectively represent the Fourier transform amplitude characteristic vector of the template signal and the sample signal, and $\langle \bullet, \bullet \rangle$ is an inner product operation. The spectral angle cosine value is within the range of $[-1,1]$, and a greater value represents a higher matching degree between signals.

FIG. 7 is a waveform graph of the amplitude characteristic template of character 0, in which the amplitude characteristic template of each character can be obtained by carrying out magnetic signal scanning, and positioning, segmentation and amplitude calculation of the scanned character signal string on the MICR character of a standard or representative medium to be recognized for a certain number of times after being processed using a certain method, such as performing average calculation on a plurality of amplitudes.

In step S309, the recognition result outputting module outputs the recognized character. The template character with the maximum spectral angle cosine value is selected as the recognized character of the character to be recognized among the spectral angle cosine value of each character in the template library 30 corresponding to the character to be recognized obtained in step S307 and then this recognized character is outputted.

The above embodiments describe an effective magnetic ink character recognition method, in which method magnetic signal scanning is performed on each character signal of the magnetic ink character, then positioning, segmentation are performed on the scanned character signal string to calculate the obtained amplitude data, and match processing is performed after spectral angle cosine calculation to obtain the character recognition result.

The above described embodiments are that the MICR character recognition apparatus is provided inside the computer 10 and the MICR reader 40 is provided outside the computer 10 to perform character recognition, which is the most common system configuration currently. In the character recognition method provided by the present invention, the MICR reader 40 of course can also be integrated with the character recognition apparatus inside one device to simplify the computer based character recognition system with an external MICR reader, which is convenient for carrying and using the recognition apparatus.

It needs to note that the step shown in the flowcharts of the drawings can be executed in a computer system such as a set of computer executable instructions, and although the logical order is shown in the flowcharts, in some cases the steps shown or described here can be executed in an order different from this in some circumstances.

Figure 10:
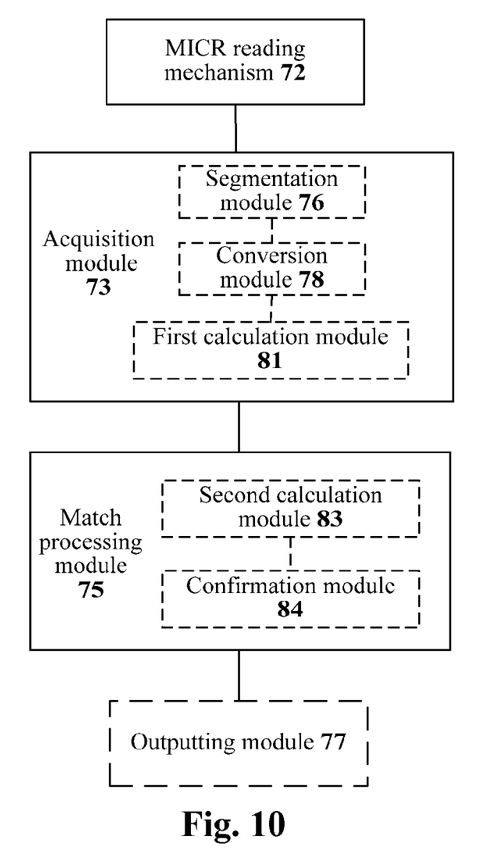
FIG. 10 is a structural schematic diagram of a magnetic ink character signal recognition apparatus according to another embodiment of the present invention.

FIG. 10 is a structural schematic diagram of a magnetic ink character signal recognition apparatus according to another embodiment of the present invention.

As shown in FIG. 10, the device includes an MICR reading mechanism 72, an acquisition module 73, and a match processing module 75.

The MICR reading mechanism 72 is used for reading the magnetic signal of the magnetic ink character on a medium to be recognized; the acquisition module 73 is used for acquiring the amplitude characteristic data of the magnetic ink character according to the magnetic signal of the magnetic ink character; and the match processing module 75 is used for performing spectral angle cosine match processing on the amplitude characteristic data of a medium to be recognized so as to obtain the recognition result of the magnetic ink character.

Preferably, the acquisition module 73 in the apparatus can further includes a segmentation module 76, a conversion module 78 and a first calculation module 81.

Preferably, the above apparatus further includes an outputting module 77 for outputting the recognition result of the magnetic ink character.

The segmentation module 76 is used for segmenting the magnetic signal of the magnetic ink character to obtain the magnetic signal of a single character, wherein the magnetic signal of the magnetic ink character is a time domain signal, and this module can be a character segmentation module 76; the conversion module 78 is used for performing Fourier transform on the magnetic signal of the single character to convert the time domain signal of the magnetic signal into a frequency domain signal, and this module can be Fourier transform module 78; and the first calculation module 81 is used for performing amplitude calculation on the frequency domain signal to obtain the amplitude characteristic data of the magnetic signal of the single character.

Preferably, the match processing module 75 of the apparatus further includes a second calculation module 83 and a confirmation module 84.

The second calculation module 83 is used for performing spectral angle cosine match processing on the amplitude characteristic data of the magnetic ink character and that of each magnetic ink character in a template library to obtain a set of magnetic ink character matching degree; and the confirmation module 84 is used for selecting the character corresponding to the maximum value of matching degree in the set as the recognition result of the magnetic ink character.

The composition block diagram of the apparatus in this embodiment of the present invention is a block diagram of the inner composition of a magnetic signal recognition apparatus integrated with an MICR reader and a character recognition system.

According to the magnetic ink character signal recognition apparatus in this embodiment, the present invention can achieve a character recognition system based on the above apparatus, and this system have all the technical features and technical functions of the magnetic ink character signal recognition apparatus.

Figure 11:
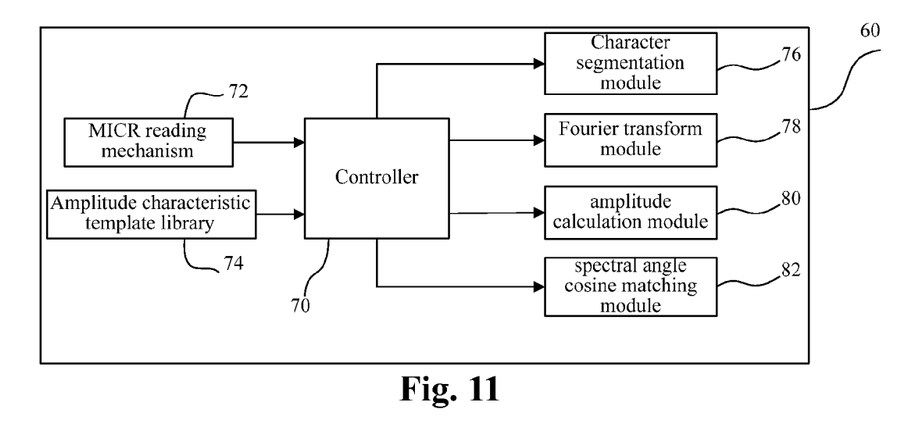
FIG. 11 is a structural schematic diagram of a magnetic ink character signal recognition apparatus according to another preferred embodiment of the present invention.

FIG. 11 is a structural schematic diagram of a magnetic ink character signal recognition apparatus according to another preferred embodiment of the present invention.

The magnetic ink signal recognition apparatus 60 as shown in FIG. 11 includes a controller 70, an MICR reading mechanism 72, a character segmentation module 76, a Fourier transform module 78, an amplitude calculation module 80, a spectral angle cosine matching module 82 and an amplitude characteristic template library 74. The MICR reading mechanism 72 is integrated with the character recognition apparatus, i.e. belonging to an embedded magnetic ink signal recognition apparatus, and then the magnetic ink signal recognition apparatus integrated with the MICR reading mechanism 72 is provide in the memory of the computer system.

The MICR reading mechanism 72 reads the magnetic ink character on the medium to be recognized, such as reading the magnetic ink character on the check feeding in the medium channel by the magnetic head to generate a magnetic signal in time domain; since the magnetic ink character on the medium are a plurality of continuous strings printed on the medium, the magnetic signal obtained by reading is a magnetic signal string; the character segmentation module 76 segments the magnetic signal string obtained by the MICR reading mechanism 72 according to certain standards into the magnetic signal of a single character; the Fourier transform module 78 performs Fourier transform on the magnetic signal of the single character after segmentation to convert the time domain signal into a frequency domain signal; the amplitude calculation module 80 performs amplitude calculation on the frequency domain signal obtained after Fourier transform to obtain the amplitude characteristic of the magnetic signal; and the spectral angle cosine matching module 82 performs spectral angle cosine calculation on the amplitude characteristic data of the medium to be recognized and the amplitude characteristic data of each character in the template library 74 to obtain a plurality of spectral angle cosine value of the corresponding template, selects the template character corresponding to the maximum spectral angle cosine value as the most matched character, and outputs this most matched character as the recognized character.

In the embodiments of the present invention, performing character recognition by carrying out spectral angle cosine matching on the amplitude characteristic of the magnetic signal of the character to be recognized after Fourier transform and the amplitude characteristic of the character template in the template library is characterized in that character recognition is performed using the similarity of the amplitude characteristic of the frequency domain signal, and the more similar the amplitude characteristic, the higher the matching degree.

Figure 12:
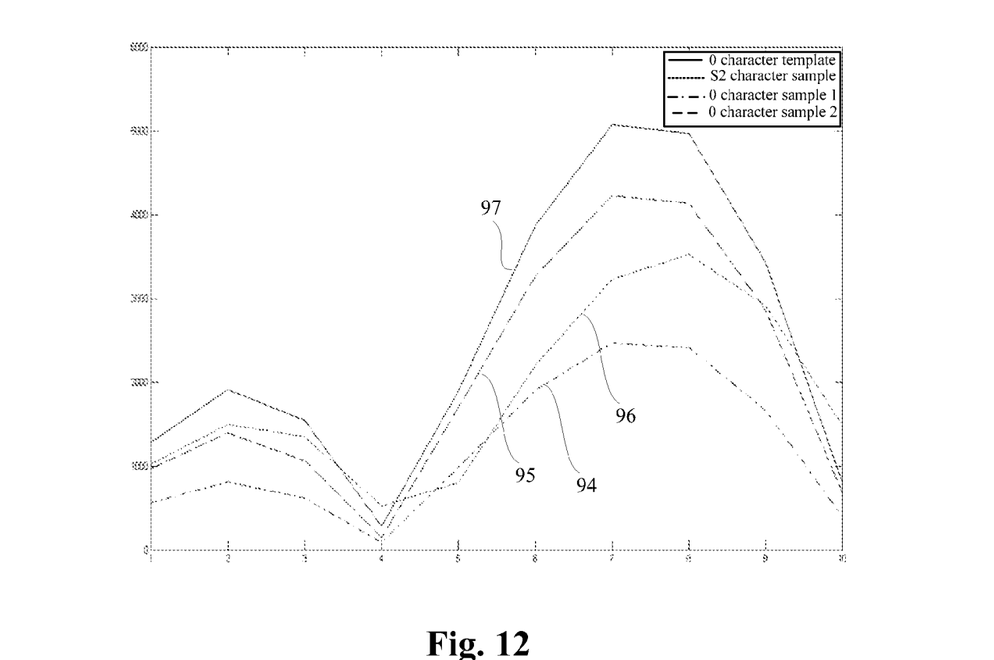
FIG. 12 is a schematic diagram of the comparison of the amplitude characteristics of a plurality of magnetic ink character signals after Fourier transform and characteristic templates according to the embodiments of the present invention.
Figure 13:
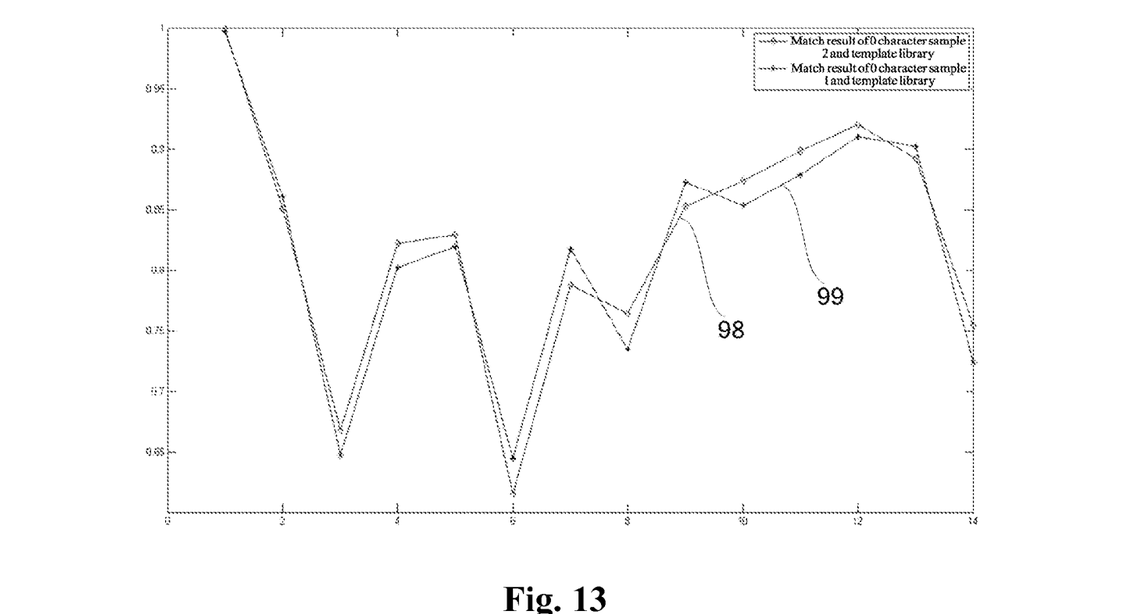
FIG. 13 is a schematic diagram of the spectral angle cosine matching of the amplitude characteristic of the magnetic signal of 2 magnetic ink characters 0.
Figure 14:
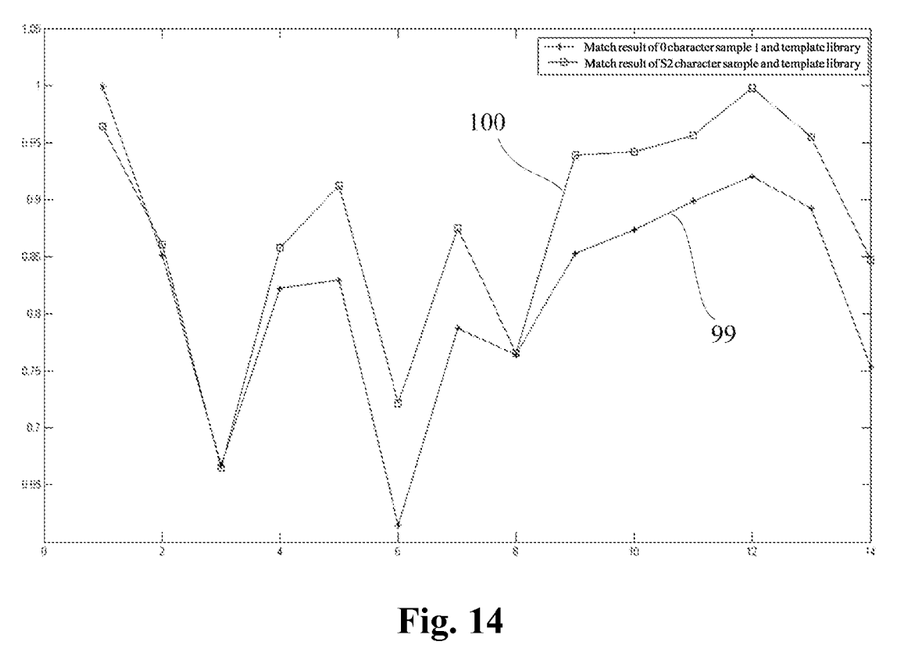
FIG. 14 is a schematic diagram of the spectral angle cosine matching of the amplitude characteristic of the magnetic signals of a magnetic ink character 0 and a character S1.

FIG. 12 is a schematic diagram of the comparison of the amplitude characteristics of a plurality of magnetic ink character signals after Fourier transform and characteristic templates according to the embodiments of the present invention; FIG. 13 is a schematic diagram of the spectral angle cosine matching degree of the amplitude characteristic of the magnetic signal of 2 magnetic ink characters 0 in FIG. 12; and FIG. 14 is a schematic diagram of the spectral angle cosine matching degree of the amplitude characteristic of the magnetic signals of a magnetic ink character 0 and a character S1 in FIG. 12.

The present invention provides an MICR character recognition method and system which performs recognition using the spectral angle cosine of the amplitude data of the magnetic signal in frequency domain and that of the template, which have the feature that the more similar the amplitude characteristic, the higher the matching degree.

In the schematic diagram of the match of the amplitude characteristics of a plurality of characters to be recognized and that of the corresponding character as shown in FIG. 12, from the comparison of the amplitude characteristic curve 94 of the signal 1 of the character to be recognized 0, the amplitude characteristic curve 95 of the signal 2 of the character to be recognized 0, and the amplitude characteristic template curve 97 of the character 0, it can be seen from the figure that although there is apparent difference in amplitude, the profiles of three curves are very similar; and the amplitude characteristic matching degree curve of two signals of the character to be recognized 0 is obtained after matching the amplitude characteristic of two signals of the character to be recognized 0 and the amplitude template.

As shown by the curve in FIG. 13, the amplitude characteristic matching degree curve 98 of the signal 1 of the character to be recognized 0 is very similar to the amplitude characteristic matching degree curve 99 of the signal 2 of the character to be recognized 0. The maximum match value of the signal 1 of the character to be recognized 0 is 1, and the maximum matching degree value of the signal 2 of the character to be recognized 0 is also 1, and the character corresponding to the template signal having the maximum matching is selected; since two template signals with the maximum matching degree are both character 0, two signals of the character to be recognized 0 are recognized correctly. In contrast, even though the amplitude of the signal amplitude characteristic curve is similar to that of the amplitude characteristic template curve, this signal still cannot be recognized wrongly when the signal amplitude characteristic curve is not similar to amplitude characteristic template curve.

As shown by the curve in FIG. 12, although the amplitude's scope of the amplitude characteristic curve 96 of the character to be recognized S1 is more similar to that of the amplitude characteristic template curve 97 than that of the amplitude characteristic curve 94 of the signal 1 of the character to be recognized 0, since the change law of the signal amplitude characteristic curve and the change in the template amplitude characteristic curve are inconsistent, such as between frequency points 4 and 5 and 7 and 8, the slant slope change of the curve 94 and that of the template curve 97 are inconsistent, and the slant slope change of the curve 96 and that of the template curve 97 are inconsistent, the amplitude characteristic match curve of the character to be recognized is affected. As shown in FIG. 14, the amplitude characteristic match curve of the character to be recognized S1 and the amplitude characteristic match curve 100 of the signal 1 of the character to be recognized 0 are different greatly, wherein the template signal of the character to be recognized S1 corresponding to the maximum amplitude characteristic matching degree (the matching degree is 0.99) is S1, and the template signal of the signal 1 of the character to be recognized 0 corresponding to the maximum amplitude characteristic matching degree (the matching degree is 1) is 0, therefore, even though the amplitude of the amplitude characteristic curve is similar, as long as the amplitude characteristic curve of the signal to be recognized and the amplitude characteristic template curve are not similar, the signal to be recognized still will not be recognized as the character corresponding to the character template. Therefore, by way of the signal recognition method which performs amplitude character match using spectral angle cosine, the present invention can effectively overcome the effect on the signal recognition rate when the signal amplitude changes significantly, reducing the requirements on the stability of the magnetic signal by signal recognition, and improving the recognition rate of the magnetic signal.

It can be seen from the above description that the present invention achieves the following technical effects: the character recognition efficiency can be improved without normalizing the Fourier transformed frequency domain signal, and overcoming the problem that the recognition rate declining caused by the significant jitter of the amplitude of the original magnetic signal availably, reducing the requirements on the stability of the magnetic signal by signal recognition, and the present recognition method can be well applied to the magnetic signal.

Apparently, those skilled in the art shall understand that the above-mentioned modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall comprise any modification, equivalent substitution and improvement within the spirit and principle of the present invention.

What is claimed is:

1. A magnetic ink character recognition method, comprising:

reading a magnetic signal of a magnetic ink character on a medium to be recognized;

acquiring amplitude characteristic data of the magnetic ink character according to the magnetic signal of the magnetic ink character; and performing spectral angle cosine match processing on the amplitude characteristic data of the magnetic ink character to obtain a recognition result of the magnetic ink character, wherein the step of performing spectral angle cosine match processing on the amplitude characteristic data of the magnetic ink character comprises performing spectral angle cosine match processing on the amplitude characteristic data of the magnetic ink character and the amplitude characteristic data of each magnetic ink character in a template library.

2. The magnetic ink character recognition method according to claim 1, wherein after performing spectral angle cosine match processing on the amplitude characteristic data of the magnetic ink character and the amplitude characteristic data of each magnetic ink character in the template library, the step of performing spectral angle cosine match processing on the amplitude characteristic data of the magnetic ink character to obtain a recognition result of the magnetic ink character further comprises:

obtaining a set of magnetic ink character matching degree; and selecting a character corresponding to the maximum value of matching degree in the set as the recognition result of the magnetic ink character.

3. The magnetic ink character recognition method according to claim 2, wherein the spectral angle cosine match processing is to perform spectral angle cosine calculation on the amplitude characteristic data of the magnetic ink character on the medium to be recognized and the amplitude characteristic data of each reference character in the template library, and the matching degree of the magnetic ink character is characterized by the obtained spectral angle cosine value of the magnetic ink character.

4. The magnetic ink character recognition method according to claim 3, wherein the spectral angle cosine value calculation is performed by the following equation:

$$\cos(x, y) = \frac{\langle x, y \rangle}{\sqrt{\langle x, x \rangle} \sqrt{\langle y, y \rangle}},$$

where x is the amplitude characteristic vector of each reference character in the template library, and y is the amplitude characteristic vector of the magnetic ink character on the medium to be recognized.

5. The magnetic ink character recognition method according to claim 4, wherein there is one or more magnetic ink character on the medium to be recognized.

6. The magnetic ink character recognition method according to claim 5, wherein when there are a plurality of magnetic ink characters on the medium to be recognized, the step of acquiring the amplitude characteristic data of the magnetic ink character according to the magnetic signal of the magnetic ink character comprises:

segmenting the continuous magnetic signals of a plurality of magnetic ink characters on the medium to be recognized to obtain single magnetic signal of the magnetic ink character, wherein the magnetic signal of the magnetic ink character is a time domain signal;

converting the magnetic signal of each magnetic ink character into a frequency domain signal by Fourier transform; and performing amplitude calculation on the frequency domain signal to obtain the amplitude characteristic data of the single magnetic signal of the magnetic ink character.

7. The magnetic ink character recognition method according to claim 3, wherein there is one or more magnetic ink character on the medium to be recognized.

8. The magnetic ink character recognition method according to claim 7, wherein when there are a plurality of magnetic ink characters on the medium to be recognized, the step of acquiring the amplitude characteristic data of the magnetic ink character according to the magnetic signal of the magnetic ink character comprises:

segmenting the continuous magnetic signals of a plurality of magnetic ink characters on the medium to be recognized to obtain single magnetic signal of the magnetic ink character, wherein the magnetic signal of the magnetic ink character is a time domain signal;

converting the magnetic signal of each magnetic ink character into a frequency domain signal by Fourier transform; and performing amplitude calculation on the frequency domain signal to obtain the amplitude characteristic data of the single magnetic signal of the magnetic ink character.

9. The magnetic ink character recognition method according to claim 2, wherein there is one or more magnetic ink character on the medium to be recognized.

10. The magnetic ink character recognition method according to claim 9, wherein when there are a plurality of magnetic ink characters on the medium to be recognized, the step of acquiring the amplitude characteristic data of the magnetic ink character according to the magnetic signal of the magnetic ink character comprises:

segmenting the continuous magnetic signals of a plurality of magnetic ink characters on the medium to be recognized to obtain single magnetic signal of the magnetic ink character, wherein the magnetic signal of the magnetic ink character is a time domain signal;

converting the magnetic signal of each magnetic ink character into a frequency domain signal by Fourier transform; and performing amplitude calculation on the frequency domain signal to obtain the amplitude characteristic data of the single magnetic signal of the magnetic ink character.

11. The magnetic ink character recognition method according to claim 1, wherein there is one or more magnetic ink character on the medium to be recognized.

12. The magnetic ink character recognition method according to claim 11, wherein when there are a plurality of magnetic ink characters on the medium to be recognized, and wherein the step of acquiring the amplitude characteristic data of the magnetic ink character according to the magnetic signal of the magnetic ink character comprises:

segmenting the continuous magnetic signals of a plurality of magnetic ink characters on the medium to be recognized to obtain single magnetic signal of the magnetic ink character, wherein the magnetic signal of the magnetic ink character is a time domain signal;

converting the magnetic signal of each magnetic ink character into a frequency domain signal by Fourier transform; and performing an amplitude calculation on the frequency domain signal to obtain the amplitude characteristic data of the single magnetic signal of the magnetic ink character.

13. The magnetic ink character recognition method according to claim 1, further comprising, after performing spectral angle cosine match processing on the amplitude characteristic data of the magnetic ink character to obtain a recognition result of the magnetic ink character:
    outputting the recognition result of the magnetic ink character.

14. A magnetic ink character recognition apparatus, comprising:
    a magnetic ink character reading mechanism for reading a magnetic signal of a magnetic ink character on a medium to be recognized;
    an acquisition module for acquiring amplitude characteristic data of the magnetic ink character according to the magnetic signal of the magnetic ink character; and
    a match processing module for performing spectral angle cosine match processing on amplitude characteristic data of a magnetic ink character to obtain the recognition result of the magnetic ink character, wherein performing spectral angle cosine match processing on the amplitude characteristic data of the magnetic ink character comprises: performing spectral angle cosine match processing on the amplitude characteristic data of the magnetic ink character and the amplitude characteristic data of each magnetic ink character in a template library.

15. The magnetic ink character recognition apparatus according to claim 14,
    wherein the acquisition module comprises:
        a segmentation module for segmenting the continuous magnetic signals of a plurality of magnetic ink characters on the medium to be recognized to obtain single magnetic signal of the magnetic ink character, wherein the magnetic signal of the magnetic ink character is a time domain signal;
        a conversion module for converting the magnetic signal of each magnetic ink character into a frequency domain signal by Fourier transform; and
        a first calculation module for performing amplitude calculation on the frequency domain signal to obtain the amplitude characteristic data of the single magnetic signal of the magnetic ink character, and
    wherein the match processing module comprises:
        a second calculation module for performing spectral angle cosine match processing on the amplitude characteristic data of the magnetic ink character and the amplitude characteristic data of each magnetic ink character in a template library to obtain a set of magnetic ink character matching degree; and
        a confirmation module for selecting a character corresponding to the maximum value of matching degree in the set as the recognition result of the magnetic ink character.

16. The magnetic ink character recognition apparatus according to claim 14, further comprising:
    an outputting module for outputting the recognition result of the magnetic ink character.

17. A magnetic ink character recognition system, comprising:
    a magnetic ink character reader providing a time domain signal of a magnetic ink character; and
    a computer system connected to the magnetic ink character reader for acquiring the amplitude characteristic data of the magnetic ink character according to the frequency domain signal obtained according to the time domain signal of the magnetic ink character, performing spectral angle cosine match processing on the amplitude characteristic data of the magnetic ink character, generating and outputting the recognition result of the magnetic ink character, wherein performing spectral angle cosine match processing on the amplitude characteristic data of the magnetic ink character comprises: performing spectral angle cosine match processing on the amplitude characteristic data of the magnetic ink character and the amplitude characteristic data of each magnetic ink character in a template library.

* * * * *